United States Patent [19]

Keusgen et al.

[11] 4,017,233

[45] Apr. 12, 1977

[54] DEVICE FOR PRODUCING CHIP BOARDS AND THE LIKE

[75] Inventors: Heinz-Everhard Keusgen, Kaiserseech; Günter Seeger; Reinhard Beyer, both of Springe, all of Germany

[73] Assignee: Bison-werke Bähre & Greten GmbH & Co. KG, Germany

[22] Filed: May 1, 1975

[21] Appl. No.: 573,530

[30] Foreign Application Priority Data

May 2, 1974 Germany .......................... 2421284

[52] U.S. Cl. ................................ 425/145; 425/101; 425/103

[51] Int. Cl.$^2$ ...................... B29C 3/06; B29C 15/00

[58] Field of Search .......... 425/145, 155, 223, 406, 425/364 R, 423, 409, 99, 101, 103, 104, 324 R, 80, 343, 467, 396; 156/580, 296, 276, 305, 62.2, 62.6; 264/40, 121, 109, 120, 128

[56] References Cited

UNITED STATES PATENTS

| | | | |
|---|---|---|---|
| 1,785,457 | 12/1930 | Pfohl | 425/104 |
| 3,150,215 | 10/1964 | Houghton | 264/121 |
| 3,377,220 | 4/1968 | Berger et al. | 264/121 |

FOREIGN PATENTS OR APPLICATIONS

| | | | |
|---|---|---|---|
| 325,550 | 12/1957 | Switzerland | 156/580 |

*Primary Examiner*—Robert L. Spicer, Jr.
*Attorney, Agent, or Firm*—Craig & Antonelli

[57] ABSTRACT

A device for forming chip boards and the like including a conveyor belt for conveying a fleece of chip material to a press for compressing the fleece, a motor for intermittently moving the conveyor belt by one press length and at least one spray nozzle for spraying a fluid mist onto the fleece before entering the press is further provided with a moving coil regulating device for controlling the supply quantity of fluid supplied to the spraying nozzles. The moving coil regulating device is made responsive to the rotational rate of the motor driving the conveyor belt so that the rate at which fluid is supplied to the fleece varies in accordance with the movement of the conveyor belt.

9 Claims, 2 Drawing Figures

DEVICE FOR PRODUCING CHIP BOARDS AND THE LIKE

BACKGROUND OF THE INVENTION

The present invention relates to a device for the treatment of the upper surface of a moving fleece used for the production of chip plates, boards or the like and/or of the top side of a motor-actuated conveyor belt serving for the moving of the fleece. More specifically, the present invention relates to a device for treatment of such a fleece or conveyor with a fluid mist to be atomized with air, such as a water mist, which can also contain additives such as anti-adhesives, glazing means or the like. The treatment is to be applied before the final pressing of the fleece and the duration of operation of the motor is controlled by means of a timing relay.

Conventional devices for the production of chip plates, boards or the like from chip- and/or fiber-like particles diluted with binding agents are provided with a fleece carrier having a strewing arrangement thereabove being stroke-wise actuated in response to the heating press. The strewing arrangement is moveable back and forth while the fleece carrier is resting and the press is closed for the formation of the chip fleece. Also known is a device for the distribution of the formed chip fleece into sections to be compressed, wherein before (i.e. upstream of) the heating press a pre-press is arranged to pre-thicken or pre-consolidate the chip fleece sections formed on the fleece carrier. The prepress is generally designed to be heatable, and between the prepress and the heating press a nozzle arrangement is designed for the application of water or the like to the chip plate section to be hot pressed (DT-Gbm 7,140,379).

The nozzle arrangement includes several atomizing nozzles, their number depending on the width of the plate, to which by means of compressed air via an automatic regulating valve water that can be thickened with an anti-adhesive is added when the fleece conveyor belt is moving.

The fluid mist leaves the atomizing nozzles at the moment when the fleece conveyor belt starts moving and is stopped as soon as the fleece conveyor belt ends its motion. Since the quantity of the fluid mist stays the same during the movement of the fleece conveyor belt, too much fluid is added during the acceleration and decceleration of the same. Another nozzle arrangement working in the same way is provided upstream of the form station in order to moisten the fleece conveyor belt also so that the lower side of the fleece does not adhere to the fleece conveyor belt.

SUMMARY OF THE INVENTION

The present invention is based on the problem of applying to each surface portion of the fleece the same amount of water or the same surface moisture, respectively, in order that a uniform steam jet effect is realized over the total length of the fleece to be formed and thus shorter pressing times realized.

This can be accomplished according to the present invention by arranging a moving coil regulating device in the supply conduit or pipe of the fluid, the coil of which is connected by the intermediary of an amplifier with the coil of a generator (i.e. a tacho-generator) operated by the conveyor belt-actuating motor. Such moving coil regulating devices are known, and they serve for the oleo-hydraulic control of the electric arc size of melting furnace electrodes.

By proceeding in this manner, the front and the last part of the moved fleece contains less fluid than has been the case before.

BRIEF DESCRIPTION OF THE DRAWINGS

The present invention will now be explained with the aid of an embodiment illustrated schematically in drawings.

DETAILED DESCRIPTION

Figure 1:
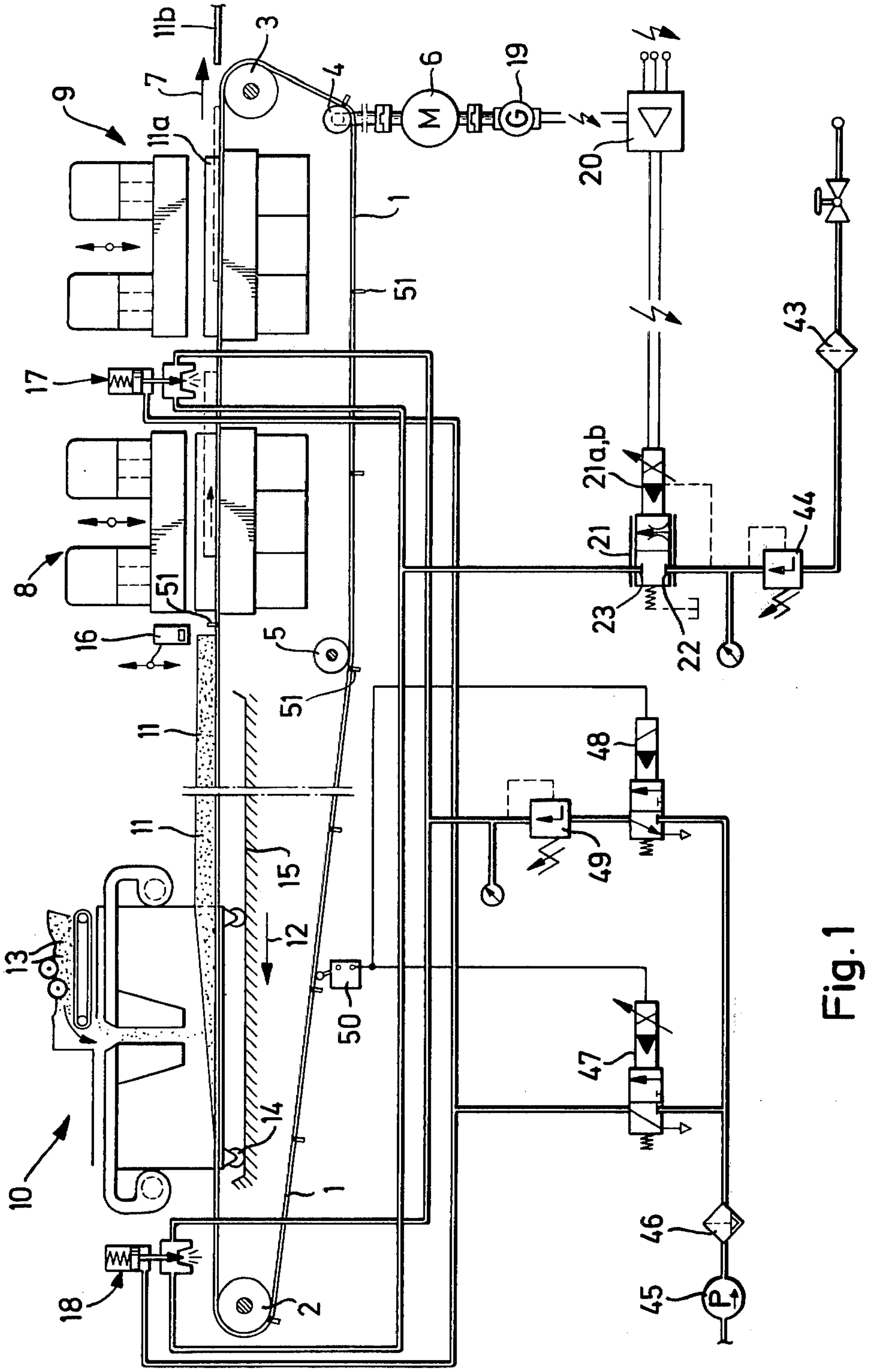
FIG. 1 is a lateral view of a known arrangement for the production of chip plates and the like with means controlling the supply of fluid according to the present invention.
Figure 2:
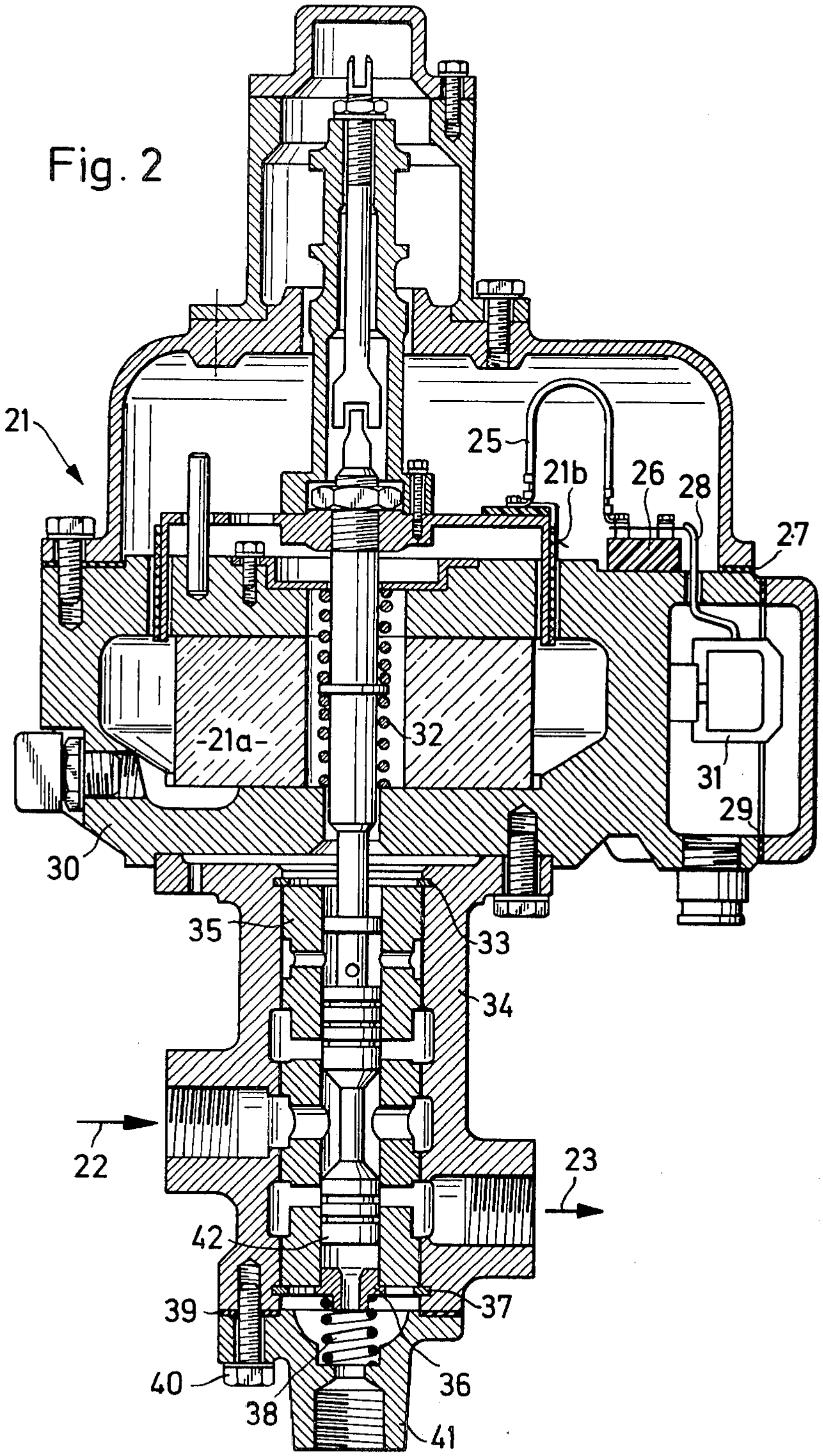
FIG. 2 is a cross-section through a known moving coil regulating device.

As shown in FIG. 1, a fleece carrier 1 composed of an endless steel band or strip is arranged around guide rollers 2, 3, 4 and 5. Guide roller 4 is driven by motor 6 in the direction of the arrow 7. The upper run of the fleece carrier 1 is guided by a pre-press 8 and a heating or finishing press 9. By means of a form station or chip fleece former 10 that can be replaced by other similar devices, a chip fleece is formed on the upper run of fleece carrier 1. Chip fleece former 10 is adapted to move from its original position close to the pre-press 8 in the direction of arrow 12. After reaching the left end position, chip fleece former 10 moves back into its initial position close to pre-press 8 without material being supplied from a dosing device 13 arranged above a strewing device on the chip fleece former, as the chip fleece former is moving back. As shown in FIG. 1, chip fleece former 10 runs on rolls 14 and associated runway rails 15.

While chip fleece former 10 is forming a chip fleece section, presses 8 and 9 are closed. Simultaneously by means of a brush, saw or the like 16 moving transversely over the breadth of the chip fleece, an interspace between the fleece sections to be compressed is created that is free of chip material.

In pre-press 8 the thickness of chip fleece section 11*a* is significantly reduced towards the thickness of the fleece 11. At the same time the chip fleece section 11*b* is compressed to its final thickness in finishing press 8 and is completely heated, i.e. cured by heating. After each press stroke, the fleece carrier 1 is moved up by one press length and a finished extruded plate is carried off in direction of the arrow 7.

A nozzle arrangement 17 is provided for spraying water or the like on to the pre-pressed chip fleece sections 11*a* during operation of the device. When fleece carrier 1 moves chip fleece section 11*a* in stepwise manner into finishing press 9, chip fleece section 11*a* is moved under nozzle arrangement 17 and past it. It is also appropriate in accordance with the present invention to arrange a nozzle arrangement 18 before, i.e. upstream of, chip fleece 10 for suitably spraying a fluid mist when the nozzle arrangement 18 is in operation.

The motor 6, which is controlled by a timing relay and which operates fleece carrier 1 in step-wise manner, is connected with a tacho-generator 19, the output voltage of which is amplified by a transistor amplifier 20 and then conducted to a known moving coil regulating device 21 which is provided with an opening for the supply of water 22 and an opening for the discharge of water 23. The most important parts of the moving coil regulating device 21 are the magnetic core 21*a*, a bell-shaped (conoid) moving coil body 21*b*, on which in several layers an isolated copper wire are coiled with the diameter of the coil being a few tenths of a millimeter, a swing coil member 25, a terminal panel 26, a housing sealing 27, a connecting lace 28, a sealing 29, a housing with magnet 30, a terminal strip 31, a retaining ring 33, a valve casing 34, a control jacket 35, a spring washer 36, a Seeger ring 37, a damping spring 38, a sealing 39 for the control valve casing, a hexagon bolt 40, a housing member 41 and a two-way slider 42 and a return spring 32 supported in the middle and operating on both sides thereof.

Water to be sprayed by means of air reaches the opening of the supply of water 22 of the moving coil regulating device 21 via a water filter 43 and a pressure reducing valve 44.

Compressed air necessary for spraying the water is led to nozzle arrangements 17 and 18 from a pump 45 via an air filter 46 with automatic separation via magnetic valves 47 and 48, whereby magnetic valve 47 makes the jet-creating air available. Behind the magnetic valve 48 another pressure reducing valve 49 is provided. The magnetic valves 47 and 48, as schematically shown, are controlled by a limit switch 50 which in turn is controlled by operating angle 51 defined by the fleece conveyor belt.

For the spraying of the areas to be moistened, conventional automatically operated air atomizing nozzles are utilized, each of which is preferably provided at a distance of 350 mm from the fleece surface and with a spraying breadth of preferably 700 mm.

While the novel principles of the invention have been described, it will be understood that various omissions, modifications and changes in these principles may be made by one skilled in the art without departing from the spirit and scope of the invention.

What is claimed is:

1. In a device for the treatment of the upper surface of a moving fleece used for the production of chip plates and the like, and/or of the upper surface of a conveyor belt provided for moving the fleece, with a fluid mist atomized with air, said treatment being accomplished before final hot pressing of the fleece, said apparatus including a motor for step-wise actuating said fleece conveyor belt and a timing relay for controlling the duration of operation of said motor, the improvement comprising a moving coil regulating device in the supply pipe supplying said fluid, a tacho-generator connected to said motor and an amplifier for amplifying the output voltage of said tacho-generator and controlling said moving coil regulating device.

2. In a device for forming chip boards including a conveyor belt for carrying a fleece of the chip material, at least one press for compressing the chip material on said conveyor to form a chip board therefrom, means for applying a treatment fluid to at least one surface of said fleece prior to completion of said chip board, a supply conduit for supplying said fluid to said supplying means, and a motor for intermittently moving said conveyor belt a predetermined distance, the improvement comprising a moving coil regulating device in said supply conduit for regulating the flow of fluid to said applying means in response to the rate of rotation of said motor.

3. The device of claim 2, further comprising a tacho-generator connected to said motor for measuring the rotational rate of said motor, said tacho-generator controlling said moving coil regulating device in response to the rotational rate of said motor.

4. The device of claim 3, further comprising an amplifier for amplifying the output voltage of said tacho-generator.

5. The device of claim 4, wherein said device includes a pre-press upstream of said press for partially compressing said fleece prior to entry of said fleece into said press.

6. The device of claim 5, wherein said applying means is positioned to apply said fluid to the upper surface of said fleece after said fleece leaves said pre-press and prior to entry of said fleece into said press.

7. The device of claim 6, wherein said applying means includes a first nozzle for applying said fluid to the upper surface of said fleece after said fleece is formed and a second nozzle for applying said fluid to the surface of said conveyor prior to formation of said fleece on said conveyor surface.

8. The device of claim 7, further comprising means for supplying air to said nozzles so that said fluid is supplied in the form of a mist.

9. The device of claim 2, further comprising means for supplying air to said supplying means so that said fluid is applied in the form of a mist.

* * * * *